(12) United States Patent
Nakamura et al.

(10) Patent No.: US 11,271,239 B2
(45) Date of Patent: Mar. 8, 2022

(54) FUEL CELL MODULE, FUEL CELL APPARATUS, AND FUEL CELL MODULE MANUFACTURING METHOD

(71) Applicants: KYOCERA CORPORATION, Kyoto (JP); DAINICHI CO., LTD., Niigata (JP)

(72) Inventors: Mitsuhiro Nakamura, Kirishima (JP); Mitsutaka Shimada, Kirishima (JP); Kyosuke Yamauchi, Kirishima (JP); Naoki Yokoo, Niigata (JP); Takayuki Maruyama, Niigata (JP); Tatsuya Kanbayashi, Niigata (JP)

(73) Assignee: KYOCERA Corporation, Kyoto (JP)

( * ) Notice: Subject to any disclaimer, the term of this patent is extended or adjusted under 35 U.S.C. 154(b) by 307 days.

(21) Appl. No.: 16/311,226

(22) PCT Filed: Jun. 15, 2017

(86) PCT No.: PCT/JP2017/022215
§ 371 (c)(1),
(2) Date: Dec. 19, 2018

(87) PCT Pub. No.: WO2017/221813
PCT Pub. Date: Dec. 28, 2017

(65) Prior Publication Data
US 2019/0237795 A1 Aug. 1, 2019

(30) Foreign Application Priority Data
Jun. 20, 2016 (JP) .............................. JP2016-122166

(51) Int. Cl.
*H01M 8/04* (2016.01)
*H01M 8/2484* (2016.01)
(Continued)

(52) U.S. Cl.
CPC ....... *H01M 8/2484* (2016.02); *H01M 8/0258* (2013.01); *H01M 8/04* (2013.01);
(Continued)

(58) Field of Classification Search
CPC .... H01M 8/2484; H01M 8/0258; H01M 8/04; H01M 8/0606; H01M 8/0612; H01M 8/24; H01M 8/2475
See application file for complete search history.

(56) References Cited

U.S. PATENT DOCUMENTS

| | | | |
|---|---|---|---|
| 2009/0239121 A1* | 9/2009 | Ono ................. | H01M 8/04007 429/405 |
| 2011/0200904 A1* | 8/2011 | Guthrie ............ | H01M 8/04029 429/444 |
| 2015/0274410 A1* | 10/2015 | Tuet ...................... | B65D 85/62 206/723 |

FOREIGN PATENT DOCUMENTS

| | | |
|---|---|---|
| EP | 1909349 A1 | 4/2008 |
| EP | 2608306 A1 | 6/2013 |

(Continued)

OTHER PUBLICATIONS

English Machine Translation: WO 2012/141304.*

*Primary Examiner* — Stephen J Yanchuk
(74) *Attorney, Agent, or Firm* — Viering, Jentschura & Partner MBB

(57) ABSTRACT

A fuel cell module includes: a cell stack apparatus including a cell stack including an array of a plurality of fuel cells, a manifold which feeds a fuel gas to each of the fuel cells, and a reformer which reforms a raw fuel; an oxygen-containing gas introduction plate which feeds an oxygen-containing gas to each of the fuel cells; and a housing which houses the cell stack apparatus and the oxygen-containing gas introduction plate. The housing includes a box having an open side and a lid which closes the open side of the box, and the box has
(Continued)

a length of the open side which is greater than a maximum length of a projected plane of the cell stack apparatus as viewed from a lateral side of the cell stack apparatus.

9 Claims, 9 Drawing Sheets

(51) Int. Cl.
    *H01M 8/0612*     (2016.01)
    *H01M 8/24*     (2016.01)
    *H01M 8/0258*     (2016.01)
    *H01M 8/0606*     (2016.01)
    *H01M 8/2475*     (2016.01)
    *H01M 8/12*     (2016.01)

(52) U.S. Cl.
    CPC ....... *H01M 8/0606* (2013.01); *H01M 8/0612* (2013.01); *H01M 8/24* (2013.01); *H01M 8/2475* (2013.01); *H01M 8/12* (2013.01); *Y02P 70/50* (2015.11)

(56) References Cited

FOREIGN PATENT DOCUMENTS

| | | | |
|---|---|---|---|
| JP | 2006331881 A | 12/2006 | |
| JP | 2009158121 A | 7/2009 | |
| JP | 2016071947 A | 5/2016 | |
| WO | 2009119615 A1 | 10/2009 | |
| WO | 2012141304 A1 | 10/2012 | |
| WO | 2012141309 A1 | 10/2012 | |
| WO | 2013008654 A1 | 1/2013 | |

\* cited by examiner

FUEL CELL MODULE, FUEL CELL APPARATUS, AND FUEL CELL MODULE MANUFACTURING METHOD

CROSS-REFERENCE TO RELATED APPLICATIONS

This application is a national stage entry according to 35 U.S.C. 371 of PCT Application No. PCT/JP2017/022215 filed on Jun. 15, 2017, which claims priority to Japanese Application No. 2016-122166 filed on Jun. 20, 2016, which is entirely incorporated herein by reference.

TECHNICAL FIELD

The present disclosure relates to a fuel cell module, a fuel cell apparatus, and a method for manufacturing the fuel cell module.

BACKGROUND

Various types of fuel cell units have been proposed, such as a fuel cell module including a cell stack, i.e. a stack of a plurality of fuel cells which produce electric power from a fuel gas (hydrogen-containing gas) and air (oxygen-containing gas) received in a housing, and a fuel cell apparatus including the fuel cell module and auxiliaries required to operate the module accommodated in a casing, e.g. an exterior case (refer to WO 2009/119615 A1 and Japanese Unexamined Patent Publication JP-A 2009-158121 (Patent Literatures 1 and 2), for example).

The above-described fuel cell module is constructed by removing front and rear walls of the housing and inserting the cell stack into the housing.

SUMMARY

A fuel cell module according to a non-limiting aspect of the present disclosure includes: a cell stack apparatus including a cell stack including an array of a plurality of fuel cells, a manifold coupled to a fuel gas supply end of each of the fuel cells, for feeding a fuel gas to each of the fuel cells, and a reformer which reforms a raw fuel to produce a fuel gas; an oxygen-containing gas introduction plate having a discharge port for discharging oxygen-containing gas, the oxygen-containing gas introduction plate feeding an oxygen-containing gas to each of the fuel cells; and a housing which houses the cell stack apparatus and the oxygen-containing gas introduction plate. The housing includes a box having an open side and a lid which closes the open side of the box. The box has a length of the open side which is greater than a maximum length of a projected plane of the cell stack apparatus as viewed from a lateral side of the cell stack apparatus.

Moreover, a fuel cell apparatus according to a non-limiting aspect of the present disclosure includes the fuel cell module described above an auxiliary machine which operates the fuel cell module; and an exterior case which houses the fuel cell module and the auxiliary machine.

Furthermore, a method of manufacturing a fuel cell module according to a non-limiting aspect of the present disclosure includes the steps of:

preparing a cell stack apparatus including
a cell stack including an array of a plurality of fuel cells;
a manifold coupled to a fuel gas supply end of each of the fuel cells, for feeding a fuel gas to each of the fuel cells; and a reformer which reforms a raw fuel to produce a fuel gas; and
a housing which houses the cell stack apparatus, including
a box having an open side made as an opening for cell stack apparatus insertion, the box having a length of the open side which is greater than a maximum length of a projected plane of the cell stack apparatus as viewed from a lateral side of the fuel cell array; and a lid which closes the open side;

orienting the box of the housing so that the opening for cell stack apparatus insertion faces upward;

laying the cell stack apparatus prepared in the preparing step on its side, inserting the cell stack apparatus lying on its side into the box from the open side, and positioning the cell stack apparatus in place;

mounting an oxygen-containing gas introduction plate around the cell stack apparatus within the box prior to or subsequent to the insertion of the cell stack apparatus; and closing the open side of the box with the lid.

BRIEF DESCRIPTION OF DRAWINGS

Other and further objects, features, and advantages of the invention will be more explicit from the following detailed description taken with reference to the drawings wherein.

DETAILED DESCRIPTION

The following describes the details of non-limiting embodiments with reference to drawings.

Figure 1:
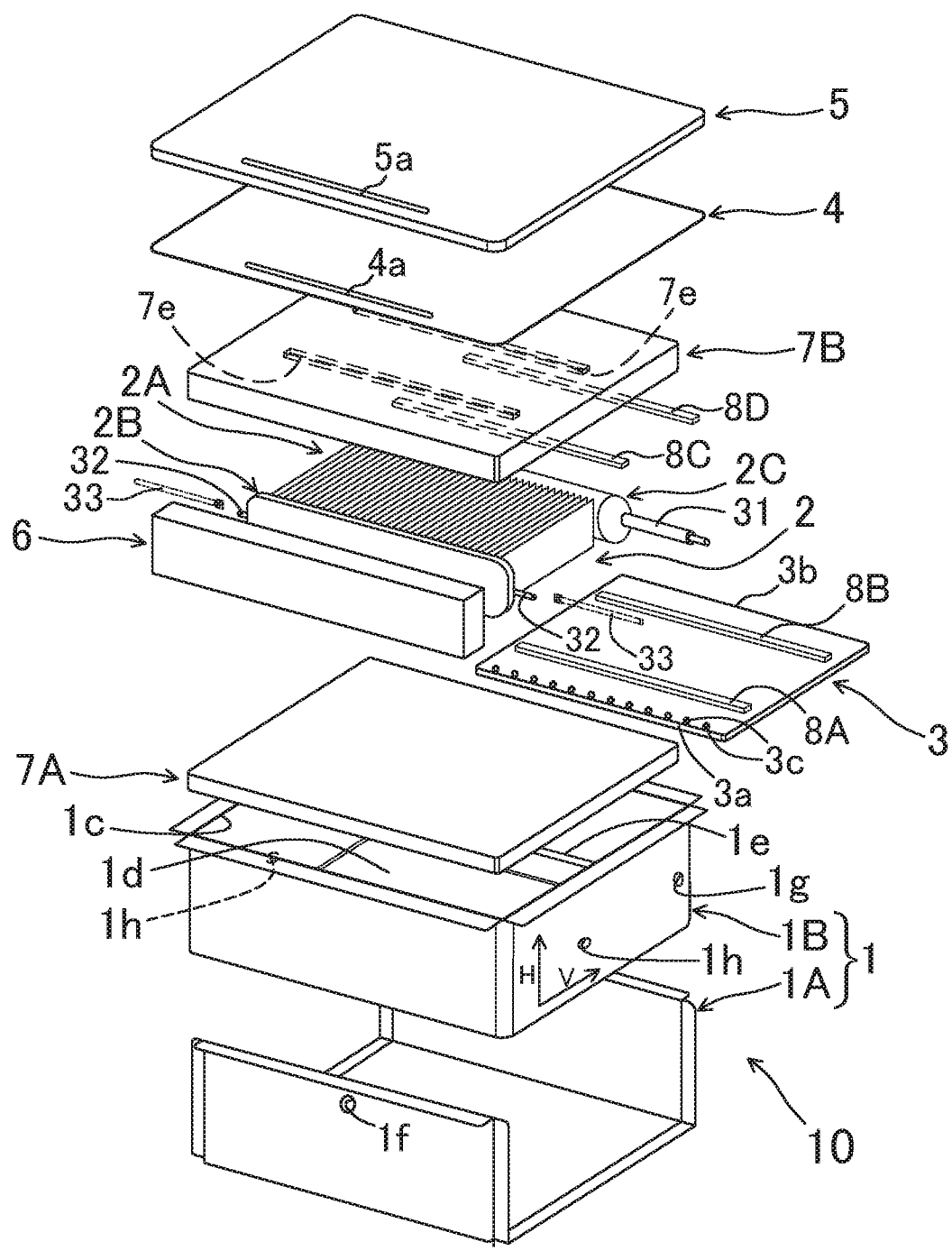
FIG. 1 is an exploded perspective view showing the structure of a fuel cell module according to a first non-limiting embodiment.

FIG. 1 is an exploded perspective view showing the structure of a fuel cell module 10 according to a first non-limiting embodiment. FIGS. 2A to 2F are views showing procedures in the assembly of the fuel cell module 10, and FIG. 3 is a sectional view showing the internal arrangement of the fuel cell module 10. In FIGS. 1 and 2, there is shown the fuel cell module 10 placed on a workbench or the like, with its housing opening (wide opening 1c) facing upward, that is; the fuel cell module 10 is laid (reclined) on its side, for the sake of module assembly. Moreover, as shown in the sectional view in FIG. 3, the fuel cell module 10 in finished form is oriented with its housing opening facing sideward so that a cell stack 2A stands vertical (in upstanding condition) during transportation or usage.

The illustrated fuel cell module 10 according to the first non-limiting embodiment is a solid-oxide fuel cell (SOFC). As shown in an as-built drawing (sectional view in FIG. 3), in the fuel cell module 10 in finished form, inside a housing 1 of double-walled structure in which a gas flow channel is left between the housing inner wall (inner case 1B) and the housing outer wall (outer cover 1A), there is provided an internal heat insulator composed of a bottom heat-insulating material 6, side heat-insulating materials 7A and 7B, etc., and there are also provided a power-generating chamber 11 and a combustion chamber 12, formed in the interior (central) space of the housing 1, for housing a cell stack apparatus 2 including a cell stack 2A, a manifold 2B, a reformer 2C, etc.

The power-generating chamber 11 and the combustion chamber 12 may be made integral with each other. Moreover, the bottom heat-insulating material 6 and the side heat-insulating materials 7A and 7B are named from their positions taken up during operation of the fuel cell module in finished form as shown in FIG. 3. That is, in the course of assembly as shown in FIGS. 1 and 2, the bottom heat-insulating material 6 is located on a lateral side of the cell stack 2A lying on its side, and the side heat-insulating materials 7A and 7B are each located on a box bottom portion 1d (bottom) side of the inner case 1B in box form located below the cell stack 2A lying on its side or on a lid (closed plate 5) side located above the cell stack 2A lying on its side.

The most striking feature of the fuel cell module 10 is that an open-sided box as shown in FIGS. 1 and 2 is used as the inner case 1B having a wide opening to form the housing 1. To permit insertion of the cell stack apparatus 2 lying on its side as shown in the drawings into the box from the opening of the box, the wide opening 1c corresponding to the upper surface of the box has an opening length or opening diameter (diagonal length) greater than the size of the lateral side of the cell stack apparatus 2 including the manifold 2B and the reformer 2C (the maximum length or the maximum cross-section diameter of the projected plane of the cell stack apparatus 2 as viewed from the side of the cell array of the cell stack apparatus 2). This makes it possible to set the cell stack apparatus 2 in a predetermined position within the housing accurately in one step without having to move the cell stack apparatus 2 around within the housing (box).

The following describes the details of the structure of the described fuel cell module 10 and a module manufacturing method (module assembly process). The fuel cell module 10 includes, basically in bottom-to-top order in the exploded perspective view of FIG. 1, the housing 1 including the outer cover 1A and the inner case 1B, the side heat-insulating material 7A, i.e. one of the heat-insulating materials located on the bottom side of the box, an oxygen-containing gas introduction plate 3 for supplying oxygen-containing gas to fuel cells, rib-shaped cell stack-retaining heat-insulating materials 8A and 8B disposed on the upper surface of the oxygen-containing gas introduction plate 3, the above-described cell stack apparatus 2 including the manifold 2B and the reformer 2C, the bottom heat-insulating material 6 disposed on the manifold 2B-bearing side of the cell stack apparatus 2, the side heat-insulating material 7B, i.e. the other one of the heat-insulating materials located on the opening side of the box, cell stack-retaining heat-insulating materials 8C and 8D disposed on the lower surface of the side heat-insulating material 7B in paired relation with the cell stack-retaining heat-insulating materials 8A and 8B, respectively, a paper gasket 4 that closes the opening of the housing 1 (inner case 1B), a closed plate 5, etc. Part of the constituent members may be omitted from the construction, or an additional member may be provided in the construction.

Constituent members including the cell stack apparatus 2, which is housed in the inner case 1B, namely the oxygen-containing gas introduction plate 3, the bottom heat-insulating material 6, the side heat-insulating materials 7A and 7B, the cell stack-retaining heat-insulating materials 8A, 8B, 8C, and 8D, etc., are each made smaller than the wide opening 1c of the inner case 1B for cell stack apparatus insertion. This allows each such member to be readily inserted and emplaced over the box bottom portion 1d (the bottom of the box as viewed from the opening) from the wide opening 1c.

Figure 2A:
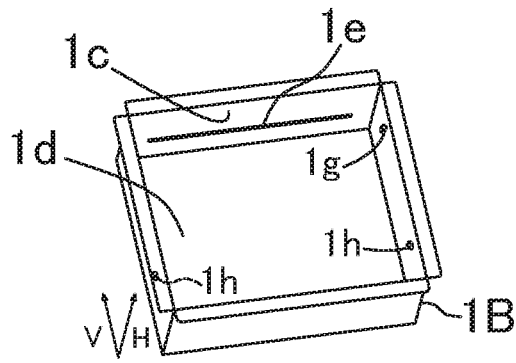
FIGS. 2A to 2F are explanatory views showing procedures in an assembly of the fuel cell module according to the first non-limiting embodiment.
Figure 3:
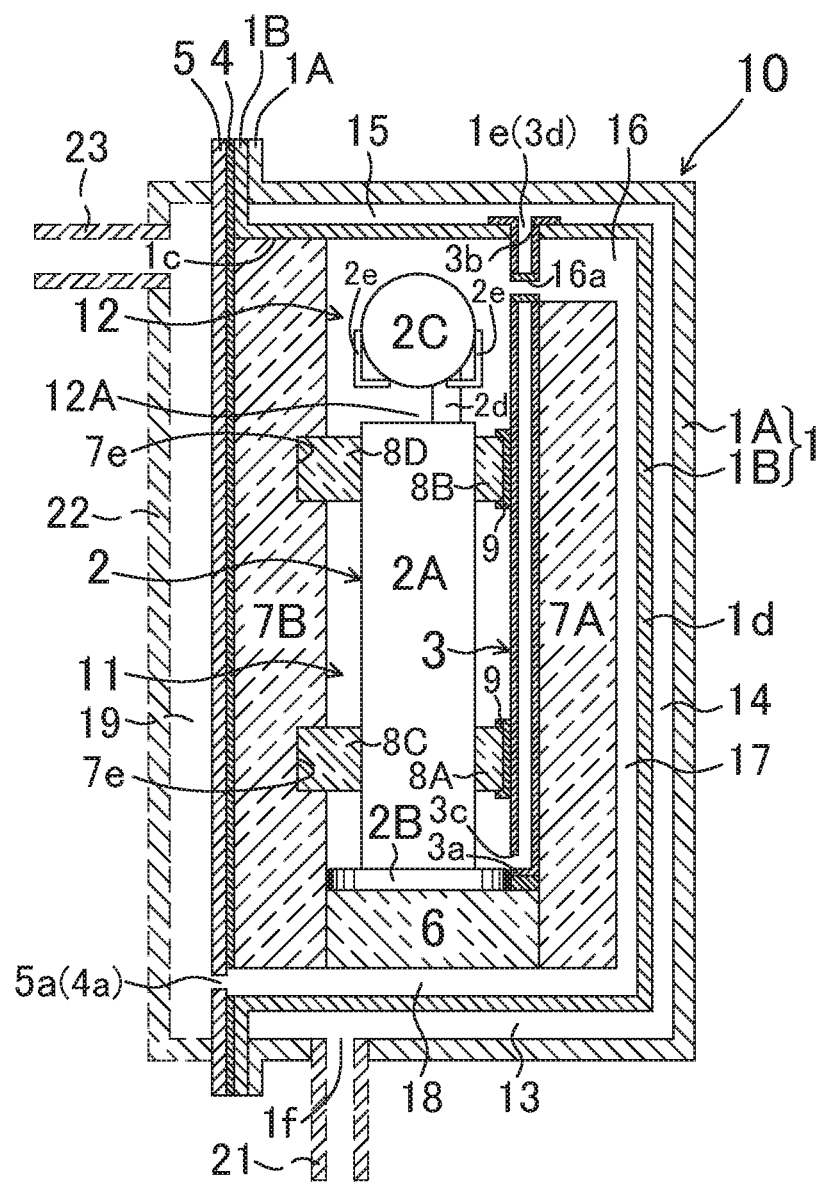
FIG. 3 is a sectional view showing the internal arrangement of the fuel cell module according to the first non-limiting embodiment.

In the process of assembly of the fuel cell module 10, at first, the cell stack apparatus 2 and the inner case 1B serving as the box of the housing 1 provided with the wide opening 1c for cell stack apparatus insertion are prepared, and then, as shown in FIG. 2A, the inner case 1B is placed on a working table or the like, with the wide opening 1c facing upward.

Figure 2B:
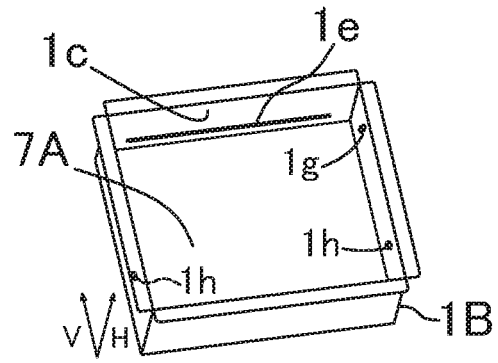

Next, as shown in FIG. 2B, from the described wide opening 1c, the side heat-insulating material 7A is inserted and emplaced over the box bottom portion 1d of the inner case 1B. When the entire housing is set in upstanding condition (stands vertical), the side heat-insulating material 7A constitutes a side wall of the power-generating chamber 11, etc. within the housing. After that, from an oxygen-containing gas outlet 1e of an oxygen-containing gas flow channel 13 formed at the inner wall of the inner case 1B, the oxygen-containing gas introduction plate 3 is inserted and emplaced over the upper side of the side heat-insulating material 7A. Then, as shown in FIG. 3, a base end 3b of the oxygen-containing gas introduction plate 3 located at an oxygen-containing gas inlet 3d is secured to the oxygen-containing gas outlet 1e by means of welding, screwing, or otherwise (not shown).

In the fuel cell module 10 having such an internal arrangement as shown in FIG. 3, prior to the placement of the side heat-insulating material 7A, a member which defines exhaust gas flow channels 16, 17, and 18 for feeding exhaust gas resulting from combustion of fuel gas to a heat exchanger, which will hereafter be described, may be set in the inner case 1B. The side heat-insulating material 7A is emplaced over this member. This condition holds true for a fuel cell module 20 according to the following second non-limiting embodiment, and also for a fuel cell module 30 according to the following third non-limiting embodiment.

Moreover, in this non-limiting embodiment, the insertion and emplacement of the oxygen-containing gas introduction plate 3 are effected prior to the insertion and emplacement of the cell stack apparatus 2, that is; the oxygen-containing gas introduction plate 3 lies closer to the box bottom portion 1d (the bottom of the box as viewed from the opening 1c) than the cell stack apparatus 2. Alternatively, as practiced in the following fourth non-limiting embodiment (shown in FIGS. 6 and 7), the insertion and emplacement of the oxygen-containing gas introduction plate 3 may be effected subsequent to the insertion and emplacement of the cell stack apparatus 2, that is; the oxygen-containing gas introduction plate 3 is located on the wide opening 1c side. In another alternative, the oxygen-containing gas introduction plate 3 may be disposed over each of the upper and lower sides of the cell stack apparatus 2, that is; there are provided two oxygen-containing gas introduction plates 3 located on the wide opening 1c side and on the box bottom portion 1d side, respectively.

In the case of securing the oxygen-containing gas introduction plate 3 by welding, where the insertion and emplacement of the oxygen-containing gas introduction plate 3 is effected prior to the insertion and emplacement of the cell stack apparatus 2 as practiced in this non-limiting embodiment, the cell stack apparatus 2 may be inserted following the completion of weld-securing of the oxygen-containing gas introduction plate 3. This protects the cell stack apparatus 2 from welding-caused thermal influence, and also facilitates retention of hermeticity. In the case of securing the oxygen-containing gas introduction plate 3 by screwing, the oxygen-containing gas introduction plate 3 may be inserted so as to be located on the wide opening 1c side of the cell stack apparatus 2.

Figure 2C:
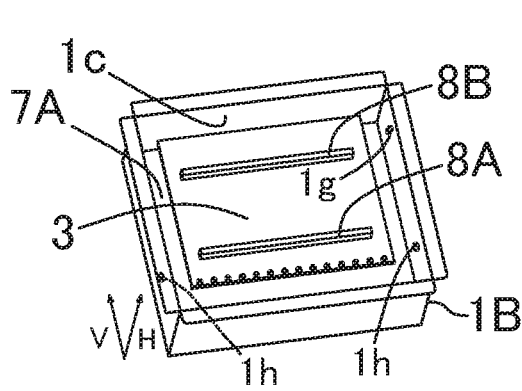

Next, as shown in FIG. 2C, the pair of rib-shaped cell stack-retaining heat-insulating materials 8A and 8B acting to support the cell stack apparatus 2 is disposed in a predetermined position on the oxygen-containing gas introduction plate 3 preparatory to the insertion of the cell stack apparatus 2. To the upper surface (cell stack apparatus 2-side surface) of the oxygen-containing gas introduction plate 3, heat insulating material-securing members 9 and 9 are mounted, which are not shown in FIGS. 1 and 2 due to their difficult-to-see positions (refer to FIG. 3), for the positioning of the cell stack-retaining heat-insulating materials 8A and 8B. Thus, when the fuel cell module is oriented with its housing opening facing sideward so that the cell stack 2A stands vertical during transportation or usage as shown in FIG. 3, the cell stack-retaining heat-insulating materials 8A and 8B are capable of supporting (holding) the cell stack apparatus 2, which will be set in a subsequent process, at appropriate positions.

Figure 2D:
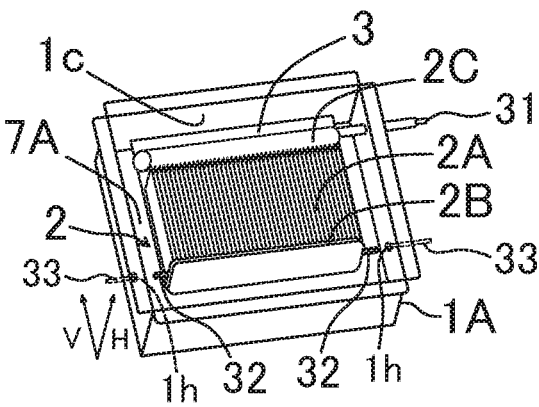

Next, the cell stack apparatus 2 prepared in the preparation step is laid on its side, and the cell stack apparatus 2 lying on its side is inserted into the inner case 1B from the wide opening 1c. Then, as shown in FIG. 2D, the cell stack apparatus 2 is set in a predetermined position over the oxygen-containing gas introduction plate 3. The cell stack apparatus 2 is fixedly positioned securely by inserting the bottom heat-insulating material 6 into a space left between the manifold 2B of the cell stack apparatus 2 and the inner case 1B. The cell stack apparatus 2 may be inserted after the insertion of the bottom heat-insulating material 6.

At the same time, in the cell stack apparatus 2, for example, installation of to-be-connected piping (flow channel) and wiring connections are performed to render the cell stack operative. That is, a fuel/water supply pipe 31 extending axially from one end of the reformer 2C is inserted through a through hole 1g for fuel/water supply pipe formed in one surface of the inner case 1B (forward surface), with the front end of the fuel/water supply pipe 31 drawn out of the housing 1. Moreover, a bus bar 33 for power collection is inserted through a through hole 1h for bus-bar connection formed in each of one surface of the inner case 1B (the forward surface formed with the through hole 1g) and the opposite surface thereof (rear surface). One of the ends of each bus bar 33 located inside the housing 1 is secured to corresponding one of bus-bar terminals 32 extending axially from the cell stack apparatus 2 by a fastening tool such as a screw.

Moreover, concurrently with the connection of piping, wiring, etc., the outer cover 1A (corresponding to the outer wall of the housing of double-walled structure), which is involved in the connectable and insertable relation between the piping, wiring, etc. and the exterior of the housing, is mounted to the outside of the inner case 1B (corresponding to the inner wall of the housing of double-walled structure). Flow channels for air and gas are defined by a space left between the cover 1A and the case 1B, and also a space left between the case 1B and the heat insulator (the side heat-insulating material 7A and the bottom heat-insulating material 6).

The insertion of the cell stack apparatus 2 may be effected under conditions where piping (flow channel), wiring, etc. have already been connected to the cell stack apparatus 2. In this case, a requirement to be fulfilled by the wide opening 1c is that its dimensions should be greater than the dimensions of the lateral side of the cell stack apparatus 2 free of connection with the piping, wiring, etc. (the maximum length or the maximum cross-section diameter of the projected plane of the cell stack apparatus 2 as viewed from the side of the cell array of the cell stack apparatus 2).

Figure 2E:
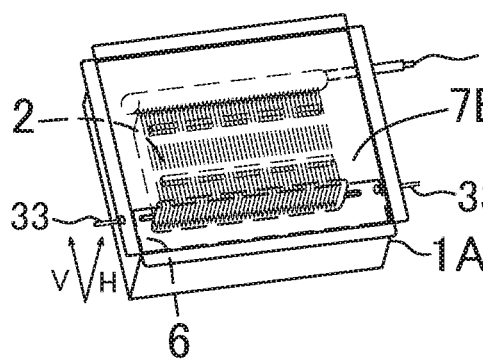
Figure 2F:
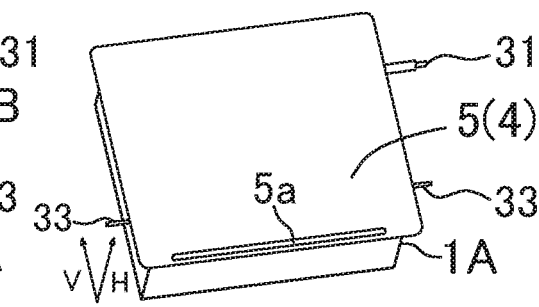

Following the completion of connection of piping, wiring, etc. in the cell stack apparatus 2, as shown in FIG. 2E, the side heat-insulating material 7B constituting a side wall of the power-generating chamber 11, etc. opposite the side wall thereof constituted by the side heat-insulating material 7A is emplaced over the cell stack apparatus 2. Lastly, the paper gasket 4 is put over the wide opening 1c so as to cover the wide opening 1c, and, as shown in FIG. 2F, the closed plate 5 is emplaced on the paper gasket 4. The closed plate 5 is screwed or otherwise fastened to the inner case 1B to close the wide opening 1c of the housing.

To the side heat-insulating material 7B constituting the opposite side wall of the power-generating chamber 11, etc. a pair of rib-shaped cell stack-retaining heat-insulating materials 8C and 8D is also mounted on the lower surface thereof hidden from view in FIG. 2E. Like the opposite cell stack-retaining heat-insulating materials 8A and 8B, the cell stack-retaining heat-insulating materials 8C and 8D are each fitted in corresponding one of groove-like recesses 7e and 7e (corresponding to the heat insulating material-securing members 9 and 9), each formed in a predetermined position of one surface of the side heat-insulating material 7B. This allows the cell stack-retaining heat-insulating materials 8C and 8D to be fixedly set in place. Thus, when the fuel cell module is oriented with its housing opening facing sideward so that the cell stack apparatus 2 stands vertical as shown in FIG. 3, the cell stack-retaining heat-insulating materials 8C and 8D are also capable of supporting (holding) the cell stack apparatus 2 at appropriate positions.

The cell stack-retaining heat-insulating materials 8C and 8D fitted in the side heat-insulating material 7B may be emplaced over the cell stack apparatus 2 in a state of being fitted in the side heat-insulating material 7B in advance. As an alternative, after the installation of the cell stack apparatus 2, the cell stack-retaining heat-insulating materials 8C and 8D may be emplaced on the cell stack apparatus 2, the cell stack-retaining heat-insulating materials 8C and 8D may be fitted in their respective recesses of the side heat-insulating material 7B, and then, the side heat-insulating material 7B may be emplaced within the housing 1.

As thus far described, in the fuel cell module manufacturing method according to a non-limiting embodiment, the cell stack apparatus 2 can be readily set in a predetermined position within the housing in one step without having to move the cell stack apparatus 2 around within the housing (box). Another advantage is that the operation of connecting piping, wiring, etc. within the housing is performed through the wide opening 1c. By virtue of enough working space, the operation can be completed quickly with facility. Consequently, the fuel cell module 10 manufacturing method according to the non-limiting embodiment achieves an improvement in module production efficiency.

Meanwhile, as part of specifics of the housing 1 for accommodating the cell stack apparatus 2, the through hole 1g for fuel/water supply pipe formed in one side (forward side) of the inner case 1B and the through hole 1h for bus-bar connection as described earlier may be provided as differently shaped holes each oriented in a certain direction as shown in enlarged views of FIGS. 8A to 8D. That is, the through hole 1g for fuel/water supply pipe may be given an oblong or elongated elliptical form extending in a direction laterally of the housing 1 (inner case 1B) (the direction indicated by H in the drawing) (refer to FIGS. 8A and 8B). In this case, during the described assembly process, the fuel/water supply pipe 31 can be readily inserted through the through hole 1g, which results in an improvement in assembly workability.

Figure 8A:
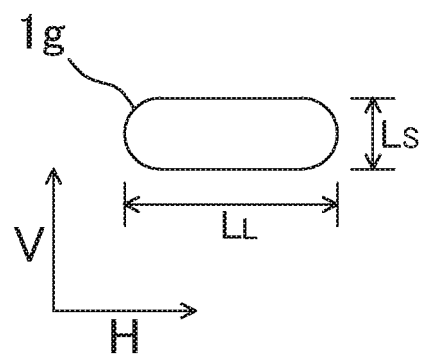
FIGS. 8A to 8D are enlarged views showing a slot formed in an inner case according to a non-limiting embodiment.
Figure 8B:
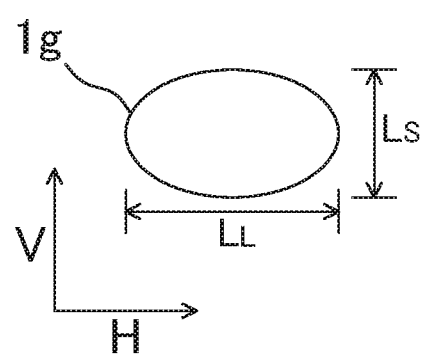
Figure 8C:
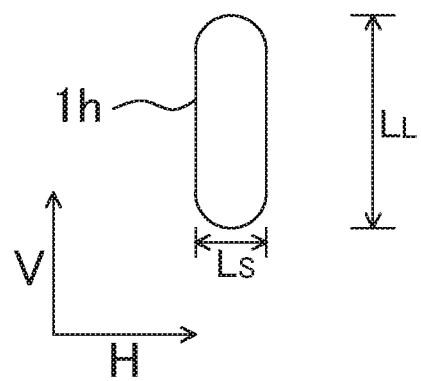
Figure 8D:
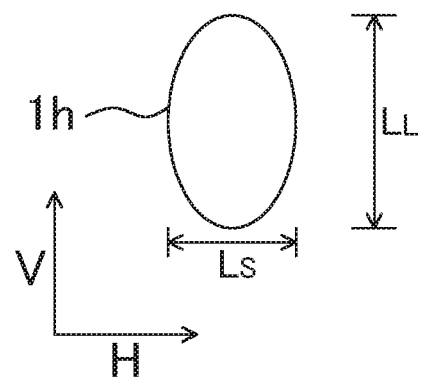

Moreover, the through hole 1h for bus-bar connection may be given an oblong or elongated elliptical form extending in a direction longitudinally of the housing 1 (the direction indicated by V in the drawing) (refer to FIGS. 8C and 8D). This design has been devised with consideration given to positional variation of the bus bar 33 in the longitudinal, i.e. vertical direction (V direction) that may occur during the installation. Thus, as is the case with the described through hole 1g, a workability improvement can be achieved in fuel-cell module assembly. Such a hole design permits a reduction in the time taken to complete fuel-cell apparatus assembly and affords greater assembly efficiency. As employed herein the oblong or elongated elliptical form of the through hole refers to a hole form which differs between its major diameter $L_L$ and minor diameter $L_S$.

The following describes the arrangement and the constituent components of the thereby constructed fuel cell module 10 received in the housing 1.

As described earlier, the cell stack apparatus 2 housed in the central space of the housing 1 (the lower power-generating chamber 11 and the upper combustion chamber 12 as viewed in FIG. 3) is constituted by a combination of the cell stack 2A, the manifold 2B, and the reformer 2C.

The cell stack 2A includes an array of upstanding columnar fuel cells of hollow flat type each having a fuel gas channel (not shown) through which a fuel gas flows in a longitudinal direction (a vertical direction during operation). Adjacent fuel cells are electrically connected in series with each other via a power-collecting member (not shown). The fuel cell may be built as a columnar cell, and thus, for example, the fuel cell may be given the form of a cylindrical configuration or the form of a horizontal stripe configuration.

Moreover, as shown in FIG. 3, the cell stack 2A is received in the power-generating chamber 11 which is located in the center of the housing and surrounded by the heat insulator (the bottom heat-insulating material 6 and the side heat-insulating materials 7A and 7B). The lower end of each fuel cell constituting the cell stack 2A is secured to the manifold 2B by an insulating joining material (not shown) such as a glass sealing material.

There is provided the reformer 2C, disposed above the cell stack 2A (on a lateral side of the cell stack 1A lying on its side in yet-to-be-completed condition as shown in FIGS. 1 and 2), for reforming a raw fuel such as natural gas or kerosene to produce a fuel gas to be supplied to the fuel cells. The fuel gas produced by the reformer 2C is fed, through a fuel gas supply pipe 2d (not shown in FIGS. 1 and 2), to the manifold 2B. The reformer 2C is retained by suspending members 2e and 2e within the combustion chamber 12 located above the power-generating chamber 11.

As shown in FIG. 3, the fuel gas which has been fed to the manifold 2B flows through the gas flow channel formed in the interior of each fuel cell (cell stack 2A) from the lower end of the channel to the upper end thereof. Each fuel cell effects power generation by exploiting the fuel gas and oxygen-containing gas (air) fed thereto from a discharge port 3c of the oxygen-containing gas introduction plate 3 located laterally of the cell.

In the cell stack apparatus 2, after the mixing of the oxygen-containing gas and excess fuel gas discharged from the terminal end of the fuel gas flow channel without serving for power generation at the upper end of each fuel cell (cell stack 2A), in a combustion portion 12A located between the cell stack 2A and the reformer 2C, ignition means or the like (not shown) ignites the gas mixture to cause combustion, and, the resultant combustion heat is utilized to heat the reformer 2C, as well as to reform the raw fuel. Thus, where the upper cell stack-retaining heat-insulating materials 8B and 8D serve to partition the centrally-located interior space of the housing into an upper space and a lower space, the reformer 2C-side upper space (high-temperature area) is referred to as the combustion chamber 12, and the cell stack 2A-side lower space (low-temperature area) is referred to as the power-generating chamber 11.

The heat insulator is disposed around the cell stack apparatus 2 to effect heat insulation for the cell stack apparatus 2, to allow the cell stack apparatus 2 to be fixedly positioned, and to define the power-generating chamber 11 and the combustion chamber 12. As shown in FIG. 3, the heat insulator includes: the large-sized side heat-insulating materials 7A and 7B, each located along corresponding one of the opposite sides of the cell stack apparatus 2 (corresponding one of the top side and the bottom side of the cell stack apparatus 2 as viewed in FIGS. 1 and 2); the cell stack-retaining heat-insulating materials 8A and 8C, as well as the cell stack-retaining heat-insulating materials 8B and 8D, located inside the side heat-insulating materials 7A and 7B for supporting the cell stack apparatus 2 so as to sandwich it between them; and the bottom heat-insulating material 6 located under the cell stack apparatus 2. As the heat insulator, it is possible to use commonly-used heat-insulating materials. For example, a heat insulator made of an alumina material, a silica material, or an alumina-silica material may be adopted for use.

As described earlier, the inward surface (the cell stack apparatus 2-side surface) of the left-hand large-sized side heat-insulating material 7B as viewed in the drawing is provided with the groove-like recesses 7e and 7e for supporting the cell stack-retaining heat-insulating materials. Moreover, the cell stack-retaining heat-insulating materials 8C and 8D, each fitted in corresponding one of the groove-like recesses 7e and 7e, support the cell stack apparatus 2 at appropriate predetermined positions.

Moreover, in the interior of the housing 1, the left-hand side heat-insulating material 7B as viewed in the drawing is disposed so as to cover the inner side of the housing 1 over a wide range extending from the lower manifold 2B to the upper reformer 2C. This arrangement is also conducive to the regulation of the space dimensions of the combustion portion 12A. That is, with the reduced space dimensions (volumetric capacity) of the combustion portion 12A, it is possible to maintain the concentration of excess fuel gas discharged into the combustion portion 12A from the cell stack 2A, at a relatively high level, without declining in concentration, and thereby achieve an improvement in ignition and combustion of excess fuel gas in the combustion portion 12A, and thus in the combustion chamber 12. Although the side heat-insulating material 7B is illustrated as having one end (upper end) extended to the inner surface of the inner case 1B in the drawing, the above-described advantageous effect may also be obtained where the side heat-insulating material 7B has its upper end extending to a point near the reformer 2C (a portion overlapping with the combustion portion 12A).

Moreover, the side heat-insulating materials 7A and 7B sandwiches the manifold 2B at the lower part of the cell stack apparatus 2 therebetween, so that the manifold 2B-bearing part of the cell stack apparatus 2 can be moderately retained and set in place. Thus, the position of the lower part of the cell stack apparatus 2 remains unchanged even when the cell stack apparatus 2 is subjected to shakiness or vibration during transportation, for example.

Moreover, as shown in FIG. 3, between the outer side of the heat insulator and the outer cover 1A (corresponding to the outer wall of the housing of double-walled structure), as well as the inner case 1B (corresponding to the inner wall of the housing of double-walled structure), there are provided, for example, a flow channel for feeding oxygen-containing gas to the cell stack apparatus 2, and a flow channel for letting out exhaust combustion gas discharged from the cell stack apparatus 2 from the apparatus, or conveying the gas to the heat exchanger, etc. Note that each sectional view is a schematic diagram in which the flow channel is illustrated as having a thickness larger than its actual thickness. That is, all of the overlapping relation between flow channels in the direction of housing thickness (a direction from the front side to the back side of the paper sheet printed with drawings), meandering configuration of the channel, alternative paths, and three-dimensional geometry of the channel are not represented faithfully in each diagram. Furthermore, the thicknesses and dimensions of other constituent components differ from their actual measurements.

The fuel cell module 10 according to the first non-limiting embodiment has oxygen-containing gas flow channels 13, 14, and 15 for feeding oxygen-containing gas to the cell stack apparatus 2, and exhaust gas flow channels 16, 17, and 18 for feeding exhaust gas resulting from combustion of fuel gas to the heat exchanger.

The exhaust gas flow channels allow hot exhaust combustion gas generated in the combustion chamber 12 to be discharged, through an exhaust gas outlet 16a formed so as to pass through the oxygen-containing gas introduction plate 3, into a space left above the side heat-insulating material 7A (the first exhaust gas flow channel 16), allow the exhaust combustion gas to travel through the second exhaust gas flow channel 17 (exhaust gas pocket at the inner side of the inner case 1B) communicating with the aforesaid space and the bottom-side third exhaust gas flow channel 18, and allow the exhaust combustion gas to be discharged, through an exhaust gas outlet 4a of the paper gasket 4 and an exhaust gas outlet 5a of the closed plate 5 disposed at the terminal end of the channel, out of the housing 1.

The housing 1 may be exteriorly provided with an external exhaust flow channel 19, which is defined by an external exhaust flow channel-forming plate 22 indicated by a phantom line (chain double-dashed line), and a discharge port 23 for directing the exhaust gas discharged out of the housing toward the heat exchanger.

Moreover, the oxygen-containing gas flow channels 13, 14, and 15, which are arranged in heat-exchangeable relation to the exhaust gas flow channels 16, 17, and 18, with the inner case 1B lying in between, include: an oxygen-containing gas (air) inlet pipe 21 (indicated by a chain double-dashed line) which receives oxygen-containing gas fed from an auxiliary machine such as an air blower (not shown); the first oxygen-containing gas flow channel 13 located on the bottom side of the housing; the second oxygen-containing gas flow channel 14, opposed to the second exhaust gas flow channel 17 (exhaust gas pocket), mainly for effecting heat exchange on exhaust gas; and the third oxygen-containing gas flow channel 15 (air reservoir) for heating the oxygen-containing gas further in a location on the top of the housing.

As shown in FIG. 3, the upper third oxygen-containing gas flow channel 15 makes connection with the oxygen-containing gas introduction plate 3 disposed so as to extend from the third oxygen-containing gas flow channel 15 toward the lower manifold 2B-bearing part in hanging-down fashion. The heated oxygen-containing gas is fed to a point near the bottom (lower end) of the columnar cell stack 2A, and from there directly to the lower end of the cell stack 2A. The oxygen-containing gas which has been fed to the lower end of the cell stack 2A further travels, in conformance with the columnar outside shape of each fuel cell, toward the upper end of the cell stack 2A.

The following describes the oxygen-containing gas introduction plate 3. For example, the oxygen-containing gas introduction plate 3 is constituted by combining two thin plate-like members together, with a cavity left between them, into a hollow thick plate form. The plate width of the oxygen-containing gas introduction plate 3 is substantially equivalent to the length of the cell stack 2A in the direction of cell arrangement. An upper base end 3b, as viewed in FIG. 3, of the oxygen-containing gas introduction plate 3, which is located on the third oxygen-containing gas flow channel 15 side for the inflow of oxygen-containing gas, corresponds to the oxygen-containing gas inlet 3d in the form of a slit opening extending in the direction of introduction plate width. Moreover, a lower front end 3a, as viewed in FIG. 3, of the oxygen-containing gas introduction plate 3, which is located on the cell stack 2A side, is provided with an oxygen-containing gas discharge port 3c spaced slightly away from the edge of the front end.

Thus constructed, the oxygen-containing gas introduction plate 3 is capable of efficient delivery of the oxygen-containing gas warmed in the upper part of the combustion chamber 12 as described above to the bottom (lower end) of the columnar cell stack 2A.

The oxygen-containing gas discharge port 3c is made as a small hole passing through one of the two thin plate-like members. Under normal conditions, a plurality of the oxygen-containing gas discharge ports 3c are disposed widthwise at predetermined spacing. Moreover, to a surface of the one thin plate-like member (the cell stack apparatus 2-side surface), the earlier described heat insulating material-securing members 9 and 9 for holding the cell stack-retaining heat-insulating materials 8A and 8B are mounted.

In the oxygen-containing gas introduction plate 3 having the oxygen-containing gas discharge port 3c, the lower end (front end 3a) extends from the reformer 2C-side upper end (base end 3b) having the oxygen-containing gas inlet 3d to the manifold 2B. In this case, even if the oxygen-containing gas introduction plate 3 undergoes heat-caused deformation, due to abutting on the manifold 2B, further deformation of the oxygen-containing gas introduction plate 3 can be suppressed.

Moreover, the front end 3a of the oxygen-containing gas introduction plate 3 may abut on the edge of the manifold 2B in advance. This makes it possible to minimize deformation and positional change of the oxygen-containing gas introduction plate 3 caused by heat and other factor, as well as to secure the abutting manifold 2B more firmly. Thus, for example, even during the transportation of the fuel cell module 10 according to this non-limiting embodiment in finished form, with the cell stack 2A standing vertical (in upstanding condition), the cell stack apparatus 2 is secured firmly, and positional change of the cell stack due to vibration shakiness, or the like is prevented.

While the described process of abutting the front end 3a on the edge of the manifold 2B is adopted as a measure to prevent deformation of the oxygen-containing gas introduction plate 3, as another deformation preventive measure, the oxygen-containing gas introduction plate 3 may be directly screw-held to other member.

Figure 4:
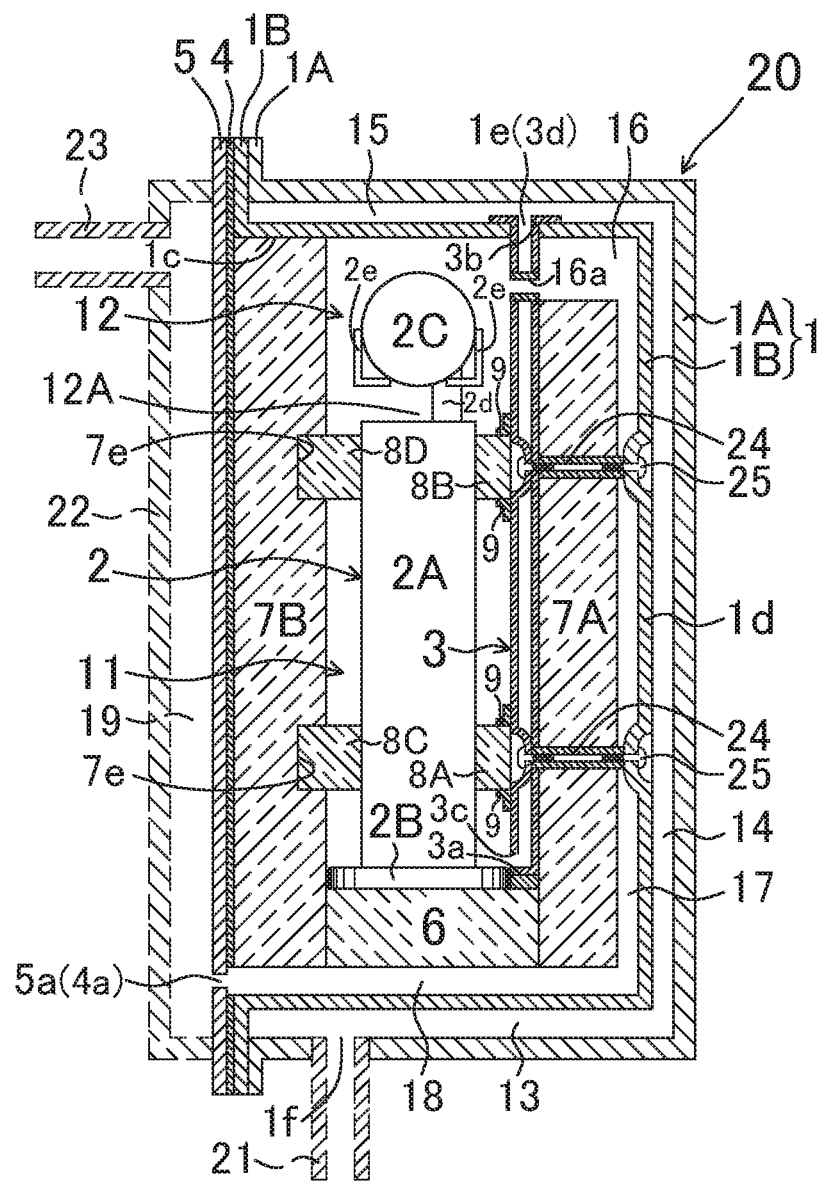
FIG. 4 is a sectional view showing the internal arrangement of a fuel cell module according to a second non-limiting embodiment.

For example, as practiced in the second non-limiting embodiment shown in FIG. 4, tubular retaining members 24 and 24 passing through the side heat-insulating material 7B may be disposed in a region between the oxygen-containing gas introduction plate 3 and the opposed box bottom portion 1d of the inner case 1B, and the oxygen-containing gas introduction plate 3 may be secured to the retaining members 24 by fastening means 25 such as screws. This makes it possible to reduce deformation and positional change of the oxygen-containing gas introduction plate 3 caused by heat and other factor, as achieved by the former preventive measure.

While the sectional view of FIG. 4 illustrates only the location where the retaining member 24 is present, in fact, a plurality of retaining members may be spaced apart in the width direction of the oxygen-containing gas introduction plate 3 (depth-wise, or the direction from the front side to the back side of the paper sheet printed with drawings). In FIG. 4, the interior space (flow channel for oxygen-containing gas or air) of the oxygen-containing gas introduction plate 3 seems to be blocked by a recess provided for the installation of the fastening means (screw) 25. However, no problem arises, because in reality a free space between the above-described recess and another recess allows oxygen-containing gas to flow therethrough as an alternative path. Thus, the number and layout of the recesses, the retaining members 24, and the fastening means 25 may be suitably determined as desired. Similar conditions hold true for recesses formed in the box bottom portion 1d of the inner case 1B. That is, also in the exhaust gas flow channel 17, in reality, a space between the recess and another recess allows exhaust gas to flow therethrough as an alternative path, and thus the number of the recesses may be determined as desired in conformity with the number of the retaining members 24, etc.

Figure 5:
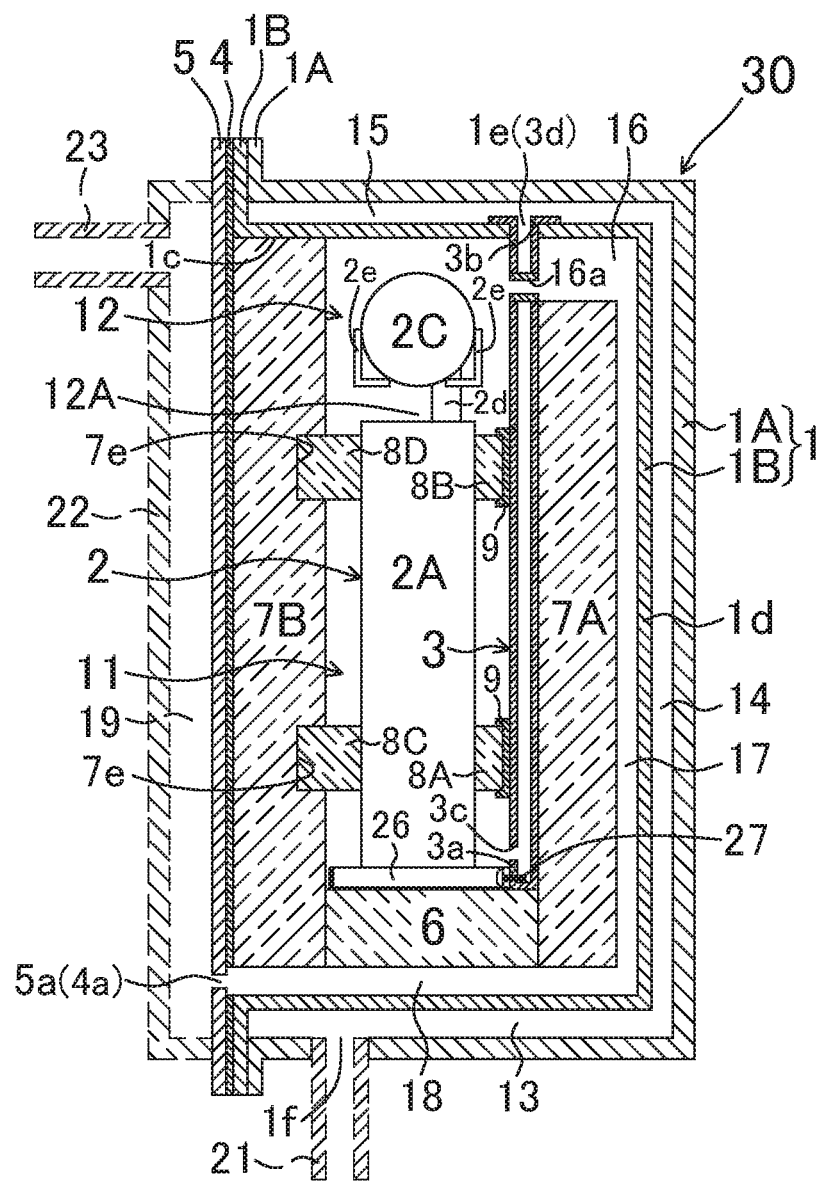
FIG. 5 is a sectional view showing the internal arrangement of a fuel cell module according to a third non-limiting embodiment.

Moreover, the manifold 2B of the cell stack apparatus 2 may contrariwise be secured to the oxygen-containing gas introduction plate 3. For example, as practiced in the third non-limiting embodiment shown in FIG. 5, a U-shaped securing member 26 surrounding the manifold (hidden from view in the drawing) may be prepared, and the U-shaped securing member 26 may be secured at each end to the oxygen-containing gas introduction plate 3 by fastening means 27 such as screws. This makes it possible to secure the cell stack apparatus 2 and the manifold 2B in position. Accordingly, there is no possibility that the position of the cell stack apparatus 2 will be shifted even when subjected to vibration during product transportation or the like. Another advantage is that even in the oxygen-containing gas introduction plate 3, now serving to secure the manifold, deformation and positional change caused by heat and other factor is suppressed.

Various modifications may be made in the shape of the retaining member or the securing member and the way of fastening the corresponding component without special limitations. For example, as the securing member, two L-shaped members may be prepared, and, part of each member may abut on an outer surface of the manifold 2B opposite to the oxygen-containing gas introduction plate 3, and then one end of each member may be secured to the oxygen-containing gas introduction plate 3 by fastening member 27 such as screws. Moreover, the retaining member and the securing member may be used in combination, and, a counterpart component of each of the retaining member and the securing member may be changed.

The following describes the fourth non-limiting embodiment that differs from the first non-limiting embodiment in respect of internal arrangement and manufacturing method (assembly process).

Figure 6:
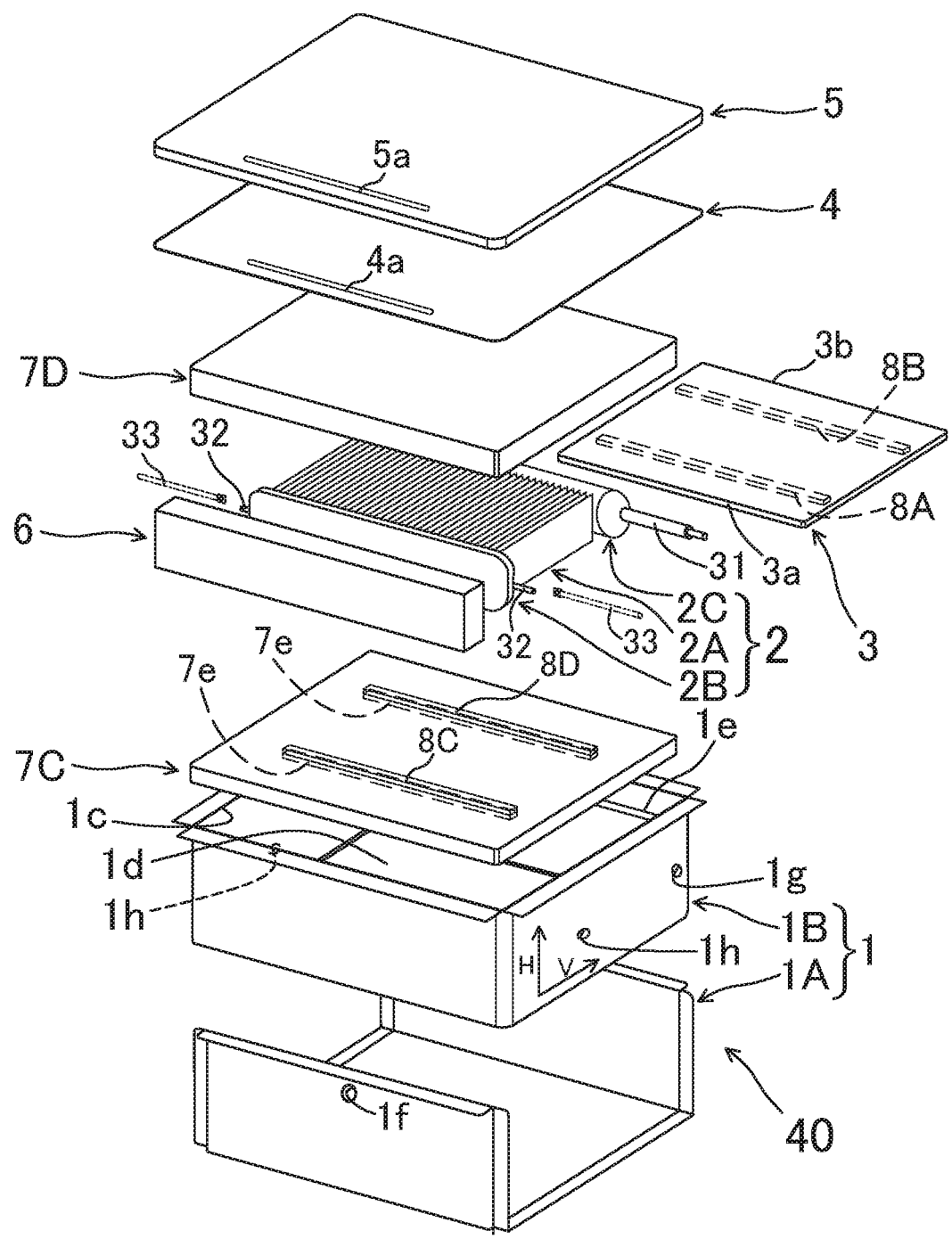
FIG. 6 is an exploded perspective view showing the structure of a fuel cell module according to a fourth non-limiting embodiment.
Figure 7:
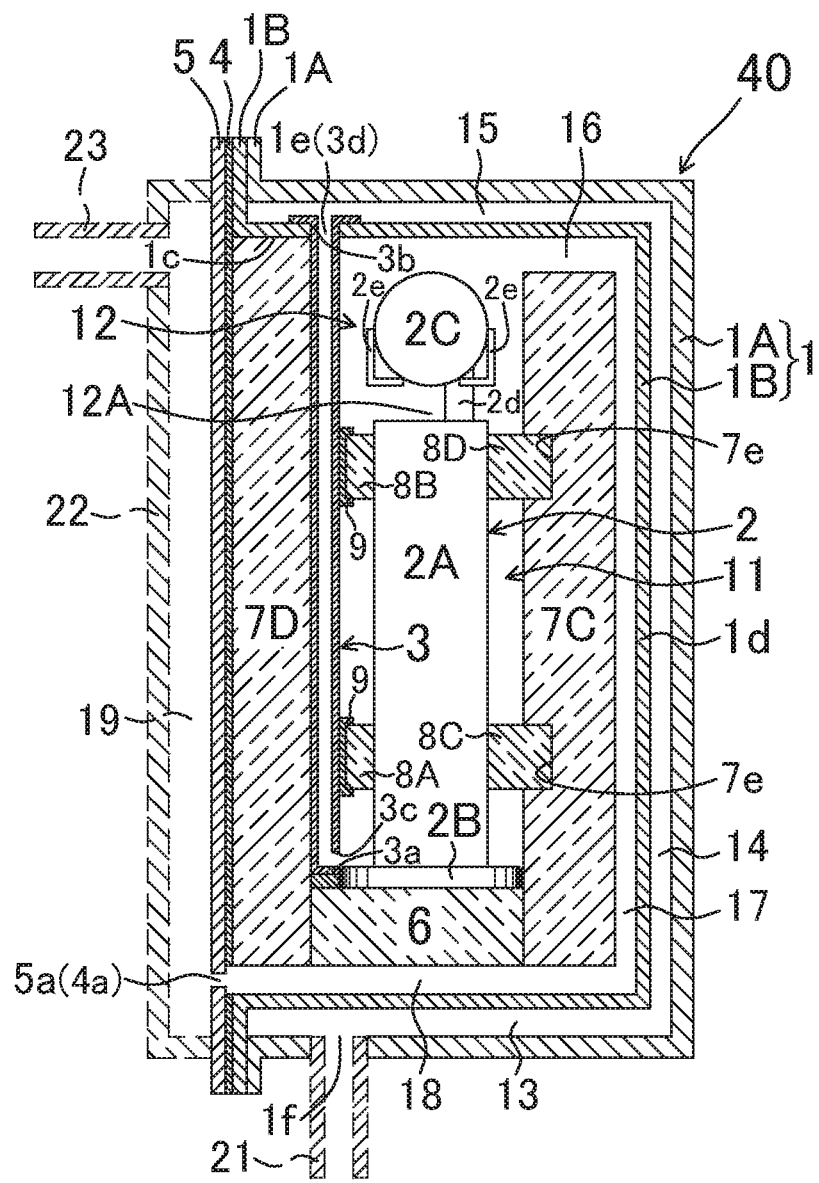
FIG. 7 is a sectional view showing the internal arrangement of the fuel cell module according to the fourth non-limiting embodiment.

FIG. 6 is an exploded perspective view showing the structure of a fuel cell module 40 according to the fourth non-limiting embodiment, and FIG. 7 is a sectional view showing the internal arrangement of the fuel cell module 40.

The fuel cell module 40 according to the fourth non-limiting embodiment is also configured so that a cell stack apparatus 2 including a cell stack 2A, a manifold 2B, a reformer 2C, etc. is housed inside a housing 1 of double-walled structure in which a plurality of gas flow channels are left between the housing inner wall (inner case 1B) and the housing outer wall (outer cover LA).

The fuel cell module 40 according to the fourth non-limiting embodiment differs from the fuel cell module 10 according to the first non-limiting embodiment in that an oxygen-containing gas introduction plate 3 for supplying oxygen-containing gas to fuel cells is located above the cell stack apparatus 2, that is; the oxygen-containing gas introduction plate 3 is mounted after the installation of the cell stack apparatus 2 in the process of assembly. Thus, as seen from the sectional view of FIG. 7, the constituent components of the fuel cell module 40 within the housing 1 are assembled in symmetrical relation (in mirror image fashion) to those of the fuel cell module 10.

As the first step in the process of assembly of the fuel cell module 40 according to the fourth non-limiting embodiment, from a wide opening 1c of the inner case 1B, a side heat-insulating material 7C, which has already been provided at an upper surface on the cell stack apparatus 2 side with cell stack-retaining heat-insulating materials 8C and 8D, is inserted and emplaced over a box bottom portion 1d of the inner case 1B. As is the case with the earlier described side heat-insulating material 7B, the cell stack-retaining heat-insulating materials 8C and 8D are each fitted in corresponding one of groove-like recesses 7e and 7e provided in predetermined positions of the side heat-insulating material 7C prior to the emplacement. Moreover, prior to the placement of the side heat-insulating material 7C, a member which defines exhaust gas flow channels 16, 17, and 18 for feeding exhaust gas resulting from combustion of fuel gas to a heat exchanger may be set in the inner case 1B. The side heat-insulating material 7C is emplaced over this member.

Moreover, the oxygen-containing gas introduction plate 3 located above the cell stack apparatus 2 is, though oriented differently, equal in configuration to the oxygen-containing gas introduction plate 3 of the first non-limiting embodiment. The lower surface of the oxygen-containing gas introduction plate 3 hidden from view in FIG. 6 is provided with heat insulating material-securing members 9 and 9 via which cell stack-retaining heat-insulating materials 8A and 8B are mounted.

The fuel cell module thus constructed affords the same advantageous effects as achieved by the first non-limiting embodiment with no problem. That is, when the fuel cell module is oriented with its housing opening facing sideward so that the cell stack 2A stands vertical during transportation or operation as shown in FIG. 7, the cell stack-retaining heat-insulating materials 8A and 8B, as well as the cell stack-retaining heat-insulating materials 8C and 8D, are each capable of supporting (holding) the cell stack apparatus 2 at appropriate positions.

Moreover, the cell stack apparatus 2 can be readily set in a predetermined position within the housing in one step without having to move the cell stack apparatus 2 around within the housing (box). In addition, there is enough working space for the operation of connecting piping, wiring, etc. within the housing, and the operation can be completed quickly with facility accordingly. Thus, the fuel cell module 40 manufacturing method according to this non-limiting embodiment also achieves an improvement in module production efficiency.

Means for retaining the oxygen-containing gas introduction plate 3, such as the retaining member 24 of the second non-limiting embodiment (refer to FIG. 4) or means for securing the manifold 2B in position, such as the securing member 26 of the third non-limiting embodiment (refer to FIG. 5) may be also disposed in the fuel cell module 40.

Figure 9:
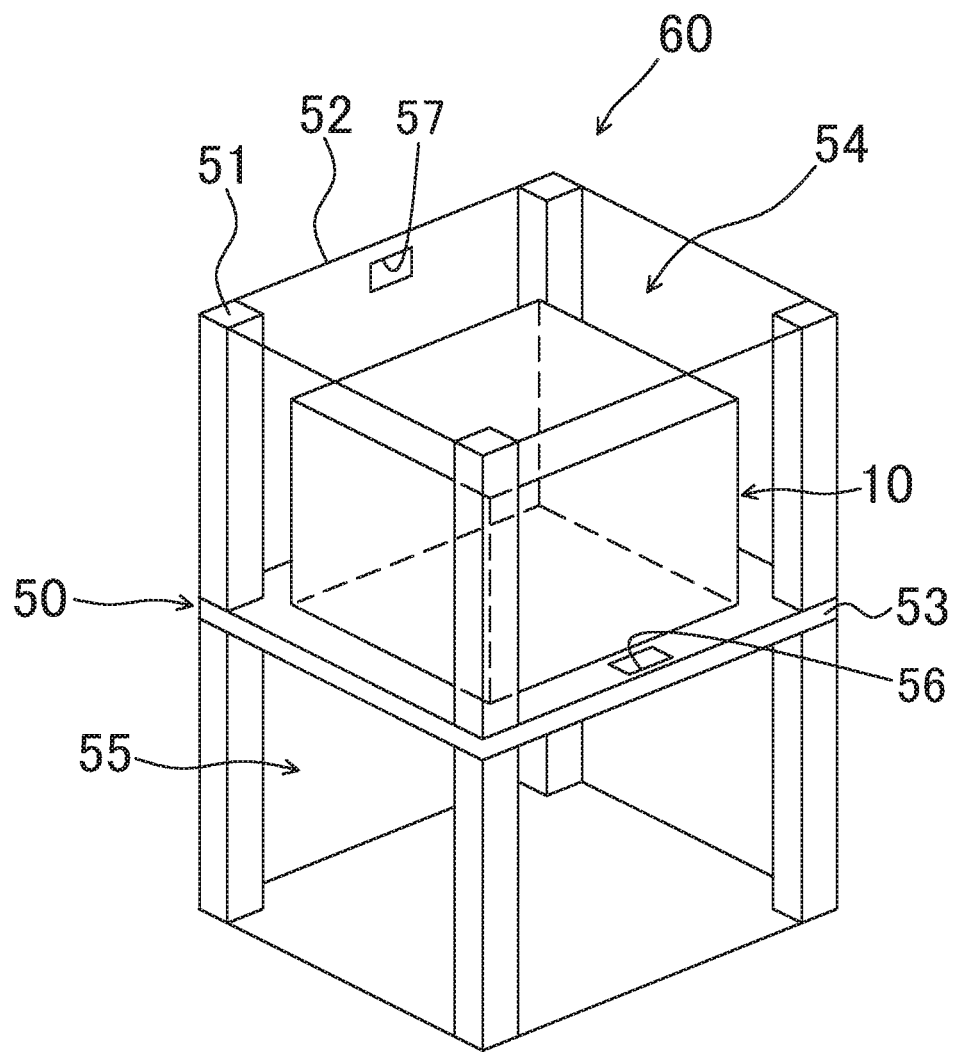
FIG. 9 is a schematic diagram showing the structure of a fuel cell apparatus incorporating the fuel cell module according to a non-limiting embodiment.

FIG. 9 is a transparent perspective view showing an exemplification of a fuel cell apparatus 60 in which the fuel cell module (10, 20, 30, 40) and auxiliary machines (not shown) such as a heat exchanger, for operating the fuel cell module are housed in an exterior case 50. In FIG. 9, part of constituent components is omitted from the construction.

In the fuel cell apparatus 60, the interior of the exterior case 50 including a support 51 and an exterior plate 52 is divided into an upper space and a lower space by a partition plate 53, and, the upper space serves as a module accommodating chamber 54 which houses the above-described fuel cell module 10 and the heat exchanger (not shown) and the lower space serves as an auxiliary accommodating chamber 55 which houses auxiliary machines which operates the fuel cell module 10. The auxiliary machines received in the auxiliary accommodating chamber 55 are not shown in the drawing.

Moreover, the partition plate 53 is provided with an air flow port 56 for allowing air in the auxiliary accommodating chamber 55 to flow into the module accommodating chamber 54, and, part of the exterior plate 52 defining the module housing chamber 54 is provided with an exhaust port 57 for exhausting air in the module accommodating chamber 54.

In the fuel cell apparatus 60 thus constructed, as described above, the fuel cell module 10 and the heat exchanger are mounted within the module housing chamber 54. This makes it possible to reduce the height-wise length of the auxiliary accommodating chamber 55, and thereby render the fuel cell apparatus 60 compact.

Although the non-limiting embodiments according to the present disclosure have been described in detail, it is understood that the application of the present disclosure is not limited to the non-limiting embodiments as described heretofore, and various changes, modifications, and improvements may be made therein without departing from the scope of the present disclosure.

For example, in the fuel cell module, the oxygen-containing gas introduction plate may be disposed on, instead of either one of the opposite sides of the cell stack apparatus, both sides of the cell stack apparatus. Moreover, the exhaust gas flow channel and the oxygen-containing gas flow channel may be formed in the closed plate 5 instead of being defined by disposing the outer cover 1A outwardly of the inner case 1B.

Moreover, the cell stack does not necessarily have to have the form of an array of cells. A cell stack apparatus having a cell stack consisting of cells arranged in different form may be used. Besides, the housing may be given any suitable shape in conformance with the geometry (outside shape) of the cell stack apparatus. For example, in addition to the shape of a rectangular parallelepiped or cylinder, the shape of a cube or rectangular column may be used.

The invention may be embodied in other specific forms without departing from the spirit or essential characteristics thereof. The present non-limiting embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

REFERENCE SIGNS LIST

1: Housing
1A: Outer cover
1B: Inner case
1c: Wide opening
1d: Box bottom portion (bottom)
2: Cell stack apparatus
2A: Cell stack
2B: Manifold
2C: Reformer
3: Oxygen-containing gas introduction plate
6: Bottom heat-insulating material
7A, 7B: Side heat-insulating material
8A, 8B, 8C, 8D: Cell stack-retaining heat-insulating material
10: Fuel cell module
13, 14, 15: Oxygen-containing gas flow channel
16, 17, 18: Exhaust gas flow channel
19: External exhaust flow channel
20: Fuel cell module
30, 40: Fuel cell module
50: Exterior case
54: Module housing chamber
60: Fuel cell apparatus

What is claimed is:

1. A fuel cell module, comprising:
a housing comprising:
a box arranged within the housing; wherein the box has an open side;
wherein the box comprises the following components arranged therein:
a cell stack apparatus comprising:
a cell stack, wherein the cell stack includes an array of fuel cells;
a manifold for feeding a fuel gas to each of the fuel cells, wherein
the manifold is coupled to a fuel gas supply end of each of the fuel cells; and
a reformer which reforms a raw fuel to produce a fuel gas;
an oxygen-containing gas introduction plate for feeding an oxygen-containing gas to each of the fuel cells, the oxygen-containing gas introduction plate comprising a discharge port for discharging oxygen-containing gas; and a lid which closes the open side of the box, wherein:

a length of the open side of the box is greater than a maximum length of a projected plane of the cell stack apparatus as viewed from a lateral side of the cell stack apparatus, and as viewed from the open side, the oxygen-containing gas introduction plate lies closer to a bottom of the box than the cell stack apparatus.

2. The fuel cell module according to claim 1, wherein a front end on an oxygen-containing gas discharge port side of the oxygen-containing gas introduction plate extends from a base end on a reformer side of the oxygen-containing gas introduction plate, the base end having an oxygen-containing gas inlet to the manifold of the cell stack apparatus.

3. The fuel cell module according to claim 1, further comprising:

a securing member which secures the cell stack apparatus to the oxygen-containing gas introduction plate.

4. The fuel cell module according to claim 3, wherein the securing member, at least partly, abuts on an outer surface of the manifold opposite to the oxygen-containing gas introduction plate, and at least one end of the securing member is fastened to the oxygen-containing gas introduction plate.

5. The fuel cell module according to claim 1, further comprising:

a side heat-insulating material interposed between the cell stack apparatus and the housing so as to be located on a lateral side of the cell stack apparatus and extend along a direction of the array of the fuel cells of the cell stack apparatus; and a cell stack-retaining heat-insulating material which retains the cell stack, wherein the cell stack-retaining heat-insulating material is fitted in a recess provided in a cell stack-side surface of the side heat-insulating material.

6. The fuel cell module according to claim 5,

Wherein the reformer is located on a side opposite to the manifold with respect to the fuel cells, and one end of the side heat-insulating material extends to a point near the reformer.

7. The fuel cell module according to claim 1, wherein the lid of the box is perpendicular to the bottom of the box.

8. The fuel cell module according to claim 1, wherein the housing comprises a discharge port arranged over the lid for directing an exhaust gas out of the housing.

9. The fuel cell module according to claim 7, wherein the housing comprises a discharge port arranged over the lid for directing an exhaust gas out of the housing.

* * * * *